(12) United States Patent
Macaraeg, Jr.

(10) Patent No.: US 11,332,958 B2
(45) Date of Patent: May 17, 2022

(54) RELEASE SYSTEMS, METHODS, AND APPARATUSES

(71) Applicant: The Boeing Company, Chicago, IL (US)

(72) Inventor: Peter Macaraeg, Jr., St. Charles, MO (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 16/422,917

(22) Filed: May 24, 2019

(65) Prior Publication Data

US 2019/0277058 A1     Sep. 12, 2019

Related U.S. Application Data

(62) Division of application No. 14/822,824, filed on Aug. 10, 2015, now Pat. No. 10,301,846.

(51) Int. Cl.
*E05B 47/00* (2006.01)
*B64C 25/26* (2006.01)
*E05B 63/00* (2006.01)
*E05C 3/02* (2006.01)

(52) U.S. Cl.
CPC .......... *E05B 47/0001* (2013.01); *B64C 25/26* (2013.01); *E05B 63/0069* (2013.01); *E05C 3/02* (2013.01); *E05B 47/0004* (2013.01)

(58) Field of Classification Search
CPC ..... B64D 45/00; E05B 51/02; E05B 15/0086; E05B 41/00; E05B 47/023; E05B 63/121; E05B 17/2011; E05B 81/10; B64C 25/26; E05C 19/145; E05C 19/14; Y10S 292/31;
(Continued)

(56) References Cited

U.S. PATENT DOCUMENTS 3,504,406 A * 4/1970 Schott ..................... B64C 25/26
                                                    24/603
3,576,337 A * 4/1971 Gudde .................... E05B 51/02
                                                    292/201

(Continued)

OTHER PUBLICATIONS

U.S. Patent and Trademark Office, Non-Final Office Action in U.S. Appl. No. 14/822,824, dated Jul. 27, 2018, 14 pages.

*Primary Examiner* — Mark A Williams
(74) *Attorney, Agent, or Firm* — Kolisch Hartwell, P.C.

(57) ABSTRACT

Systems, apparatuses, and methods of releasing doors that are locked in a closed position. The apparatus may include a follower assembly movably attached to a locking member that moves between a secured position and an unsecured position. The follower assembly may include a first locking element. The apparatus may additionally include a second locking element configured to move between a locking position in which the second locking element engages the first locking element, and an unlocking position in which the second locking element is spaced from the first locking element. The apparatus may further include a support assembly configured to move between a proximal position in which the support assembly supports the second locking element in the locking position, and a distal position in which the support assembly allows the second locking element to move from the locking position to the unlocking position.

20 Claims, 9 Drawing Sheets

(58) Field of Classification Search
CPC ... F16B 1/0057; F16B 21/12; E05Y 2900/502
See application file for complete search history.

(56) References Cited

U.S. PATENT DOCUMENTS

| | | | |
|---|---|---|---|
| 3,942,828 A * | 3/1976 | Bourrie | E05B 17/2011 |
| | | | 292/201 |
| 5,288,037 A * | 2/1994 | Derrien | B64C 25/26 |
| | | | 244/102 SL |
| 5,289,615 A | 3/1994 | Banks et al. | |
| 5,305,969 A | 4/1994 | Odell et al. | |
| 5,344,197 A * | 9/1994 | Rouzaud | E05B 63/14 |
| | | | 292/201 |
| 5,735,557 A * | 4/1998 | Harvey | F02K 1/766 |
| | | | 292/216 |
| 5,765,883 A | 6/1998 | Dessenberger et al. | |
| 5,931,415 A | 8/1999 | Lingard et al. | |
| 6,139,073 A * | 10/2000 | Heffner | E05B 81/14 |
| | | | 292/201 |
| 6,513,841 B1 | 2/2003 | Jackson | |
| 6,866,226 B2 | 3/2005 | Pratt et al. | |
| 6,866,227 B2 | 3/2005 | Pratt et al. | |
| 7,357,354 B2 | 4/2008 | Mortland | |
| 7,360,803 B2 * | 4/2008 | Parent | E05B 81/14 |
| | | | 292/117 |
| 8,919,698 B2 | 12/2014 | Kim et al. | |
| 8,919,829 B2 | 12/2014 | Hernandez | |
| 2003/0164422 A1* | 9/2003 | Collet | B64C 25/26 |
| | | | 244/102 R |
| 2006/0208501 A1* | 9/2006 | Harvey | E05B 51/02 |
| | | | 292/201 |
| 2009/0283634 A1* | 11/2009 | Tran | E05B 51/02 |
| | | | 244/102 A |
| 2009/0284025 A1* | 11/2009 | Salcombe | E05C 3/26 |
| | | | 292/201 |
| 2017/0044798 A1* | 2/2017 | Macaraeg, Jr. | B64C 25/26 |

* cited by examiner

RELEASE SYSTEMS, METHODS, AND APPARATUSES

CROSS-REFERENCE

This application is a divisional application of U.S. patent application Ser. No. 14/822,824, filed Aug. 10, 2015 and issued as U.S. Pat. No. 10,301,846 on May 28, 2019. The complete disclosure of the above-identified patent application is hereby incorporated by reference for all purposes.

FIELD

This disclosure relates to release systems, methods, and apparatuses. More specifically, disclosed embodiments relate to release systems, apparatuses, and methods for opening doors that are locked in a closed position.

INTRODUCTION

A locking mechanism may be used to secure a movable component in a particular position, such as a door in a closed position. For example, a locking mechanism may be used on an aircraft to secure doors (e.g., landing gear doors, ordinance compartment doors, etc.) in a closed position. Those locking mechanisms may sometimes be referred to as "door capture lock mechanisms."

Situations may occur in which the door must be moved to an open position while the locking mechanism still has the door secured in the closed position. Thus, a locking mechanism may include a redundant actuator and/or redundant port to allow the door to be moved to an open position in those situations. However, the redundant actuator and/or port must rely on the integrity of the other components of the locking mechanism to open the door. Alternatively, the locking mechanism may include sacrificial and/or shearable connections to allow a user to break or destroy the locking mechanism to move the door to an open position. However, those locking mechanisms must be replaced and/or repaired after each use.

SUMMARY

The present disclosure provides a release mechanism. In some embodiments, the release mechanism may include a follower assembly movably attached to a locking member that moves between a secured position in which the locking member secures a component in a first position, and an unsecured position in which the locking member allows the component to be moved between the first position and a second position different from the first position. The follower assembly may include a first locking element. The release mechanism may additionally include a second locking element configured to move between a locking position in which the second locking element engages the first locking element, and an unlocking position in which the second locking element is spaced from the first locking element. The release mechanism may further include a support assembly configured to move between a proximal position in which the support assembly supports the second locking element in the locking position, and a distal position in which the support assembly allows the second locking element to move from the locking position to the unlocking position. The follower assembly may be movably attached to the locking member such that the locking member is allowed to move between the secured and unsecured positions when the first locking element is engaged by the second locking element in the locking position. The follower assembly may be configured to move the locking member between the secured and unsecured positions when the second locking element is spaced from the first locking element in the unlocking position.

The present disclosure provides a door lock system. In some embodiments, the door lock system may include a housing, a lock assembly, and a release mechanism. The lock assembly may include a locking member configured to pivot about a second pivot between a secured position in which the locking member secures a door in a closed position, and an unsecured position in which the locking member allows the door to be moved between the closed position and an open position. The lock assembly may additionally include a first actuator assembly having a piston configured to move between a first position in which the locking member is in the secured position, and a second positon in which the locking member is in the unsecured position. The release mechanism may include a follower assembly pivotably attached to the locking member at a first pivot. The follower assembly may include a first locking element. The release mechanism may additionally include a second locking element configured to move between a locking position in which the second locking element engages the first locking element, and an unlocking position in which the second locking element is spaced from the first locking element. The release mechanism may further include a support assembly configured to move between a proximal position in which the support assembly supports the second locking element in the locking position, and a distal position in which the support assembly allows the second locking element to move from the locking position to the unlocking position. The release mechanism may additionally include a second actuator assembly configured to move the support assembly to the distal position. The follower assembly may be configured to allow a user to move the follower assembly from an engaged position in which the locking member is in the secured position, to a release position in which the locking member is in the unsecured position when (1) the support assembly is in the distal position and (2) the piston of the first actuator assembly is in the first position.

The present disclosure provides a method of managing access through a door. In some embodiments, the method may include activating an actuator of a first actuator assembly to move a piston from a second position in which a locking member is in an unsecured position that allows the door to be moved between closed and open positions, to a first position in which the locking member is in a secured position that secures the door in the closed position. The method may additionally include activating an actuator of a second actuator assembly to unlock a follower assembly that is pivotably attached to the locking member. The second actuator assembly may be different from the first actuator assembly. The method may further include moving the follower assembly from an engaged position in which the locking member is in the secured position, to a release position in which the locking member is in the unsecured position with the piston of the first actuator assembly in the second position.

Features, functions, and advantages may be achieved independently in various embodiments of the present disclosure, or may be combined in yet other embodiments, further details of which can be seen with reference to the following description and drawings.

DESCRIPTION

Overview

Various embodiments of systems, apparatuses, and methods for releasing a locking member of a locking mechanism are described below and illustrated in the associated drawings. Unless otherwise specified, a system, an apparatus, or a method and/or their various components may, but are not required to, contain at least one of the structures, components, functionality, and/or variations described, illustrated, and/or incorporated herein. Furthermore, the structures, components, functionalities, and/or variations described, illustrated, and/or incorporated herein in connection with the present systems, apparatuses, and methods may, but are not required to, be included in other similar systems, apparatuses, or methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Examples, Components, and Alternatives

The following sections describe selected aspects of exemplary systems, apparatuses, and methods for releasing a locking member of a locking mechanism as well as related systems, apparatuses, and/or methods. The examples in these sections are intended for illustration and should not be interpreted as limiting the scope of the present disclosure. Each section may include one or more distinct examples, and/or contextual or related information, function, and/or structure.

Example 1

Figure 1:
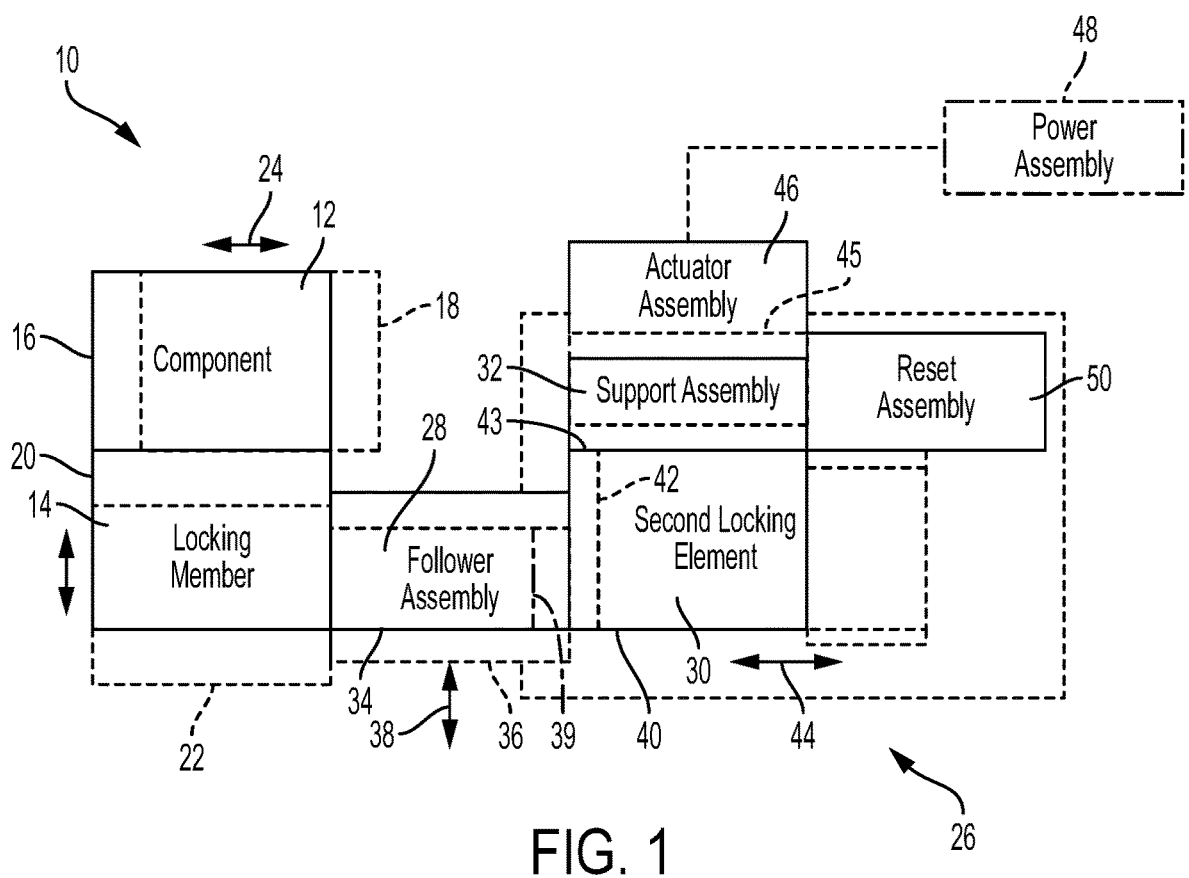
FIG. 1 is a block diagram of an illustrative system, an illustrative component, and an illustrative locking member.

This example describes a lock release system, see FIG. 1.

FIG. 1 is a block diagram of an illustrative system, generally indicated at 10, including an illustrative component 12, and an illustrative locking member 14. Component 12 may be able to move between a first position 16, indicated by a solid line in FIG. 1, and a second position 18, indicated by a dashed line in FIG. 1. The first and second positions may be different. Locking member 14 may be able to move, in this case from a secured position 20, indicated by a solid line in FIG. 1, to an unsecured position 22, indicated by a dashed line in FIG. 1.

When locking member 14 is in the unsecured position, component 12 may move freely between the first and second positions 16 and 18 as indicated by arrow 24. When system 10 is in a configuration where component 12 is in first position 16 and locking member 14 is in secured position 20, component 12 may be prevented from moving by locking member 14.

System 10 may include a release mechanism, generally indicated at 26, including a follower assembly 28, a second locking element 30, and a support assembly 32. Release mechanism 26 may move locking member 14 from secured position 20 to unsecured position 22, thereby releasing component 12. Locking member 14 may be able to move from the secured to the unsecured position without activating release mechanism 26, perhaps due to the activation of another release mechanism, not shown in FIG. 1, besides release mechanism 26.

Follower assembly 28 may be movably attached to locking member 14. That is, the follower assembly may be operatively coupled to the locking member in a manner that allows the relative dispositions of the follower assembly and the locking member to change while the follower assembly and the locking member remain attached. The follower assembly may be able to move between an engaged position 34, indicated with a solid line in FIG. 1, and a release position 36, indicated with a dashed line in FIG. 1, the movement of the follower assembly indicated by double arrow 38. When follower assembly 28 is in engaged position 34, locking member 14 may be held in secured position 20. When follower assembly 28 is in release position 36, locking member 14 may be in unsecured position 22. The follower assembly may include a first locking element 39. The position of follower assembly 28 may be held constant relative to the rest of release mechanism 26 by the first locking element.

Second locking element 30 may prevent follower assembly 28 from moving from engaged position 34 to release position 36. Second locking element 30 may be configured to move from a locking position 40, indicated with a solid line in FIG. 1, to an unlocking position 42, indicated with a dashed line in FIG. 1. When the second locking element is in locking position 40, the second locking element may engage follower assembly 28, thereby preventing the movement of the follower assembly. Second locking element 30 may engage follower assembly 28, such as by engaging with first locking element 39 of the follower assembly. When the second locking element is in unlocking position 42, the second locking element may be spaced from the first locking element. When release mechanism 26 is configured so that the second locking mechanism is in the unlocking position, follower assembly 28 may move from the engaged position to the release position and back, as indicated by double arrow 38 in FIG. 1.

Support assembly 32 may be configured to move between a proximal position 43 and a distal position 45. When in proximal position 43, the support assembly may support the second locking element in the locking position. When in distal position 45, the support assembly may allow the second locking element to move from the locking position to the unlocking position. The movement back and forth between the locking and unlocking positions of the second locking element is indicated by double arrow 44 in FIG. 1.

Support assembly 32 may be move from the proximal position to the distal position as a result of an actuator assembly 46, which may operate by any appropriate mechanical or electrical means. In some examples, actuator assembly 46 may be powered by power assembly 48 configured to apply the appropriate type and/or amount of power necessary for the actuator assembly to move the support assembly from the proximal to the distal positions. The actuator assembly may include at least one bias element configured to urge the support assembly toward the proximal position.

Power assembly 48 may include any suitable source of power to allow actuator assembly 46 to move the support assembly. For example, power assembly 48 may include a hydraulic system configured to provide hydraulic pressure to the actuator assembly. Alternatively, power assembly 48 may include a pneumatic system configured to provide pneumatic pressure to the actuator assembly. In some examples, actuator assembly 46 may include a solenoid valve, while power assembly 48 may include one or more electrical cords and/or a source of electric power to power the solenoid valve.

The following steps show one possible method of using release mechanism 26 to move locking member 14 from the secured position to the unsecured position, thereby releasing component 12: First, actuator assembly 46 may be activated by power assembly 48 and subsequently move support assembly 32 from the proximal position to the distal position. This may allow second locking element 30 to move from the locking position to the unlocking position. Follower assembly 28 may then be moved from the engaged position to the release position, which may move locking member 14 from the secured to the unsecured position. With locking member 14 in the unsecured position, component 12 may be free to move between the first and second positions. Once follower assembly 28 has been moved to the release position, the support assembly may return to the proximal position (such as via urging from the bias element(s) of the actuator assembly), and the second locking element may return to the locking position.

The following steps show one possible method of securing component 12 in the first position after use or activation of release mechanism 26: First, component 12 may be placed in the first position. Then, a reset assembly 50 may be accessed to move the support assembly from the proximal position to the distal position, which may allow the second locking element to move from the locking position to the unlocking position. The follower assembly may then be moved from the release position to the engaged position, which may move the locking member from the unsecured position to the secured position. The reset assembly may then be released, which may allow the support assembly to be moved toward the proximal position (such as via urging of the bias element(s)) and the second locking element may be placed in the locking position.

Thus, release mechanism 26 may be repeatably used to secure and release component 12.

Example 2

This example describes a lock release mechanism and methods of operation of the lock release mechanism, see FIGS. 2-9.

Figure 2:
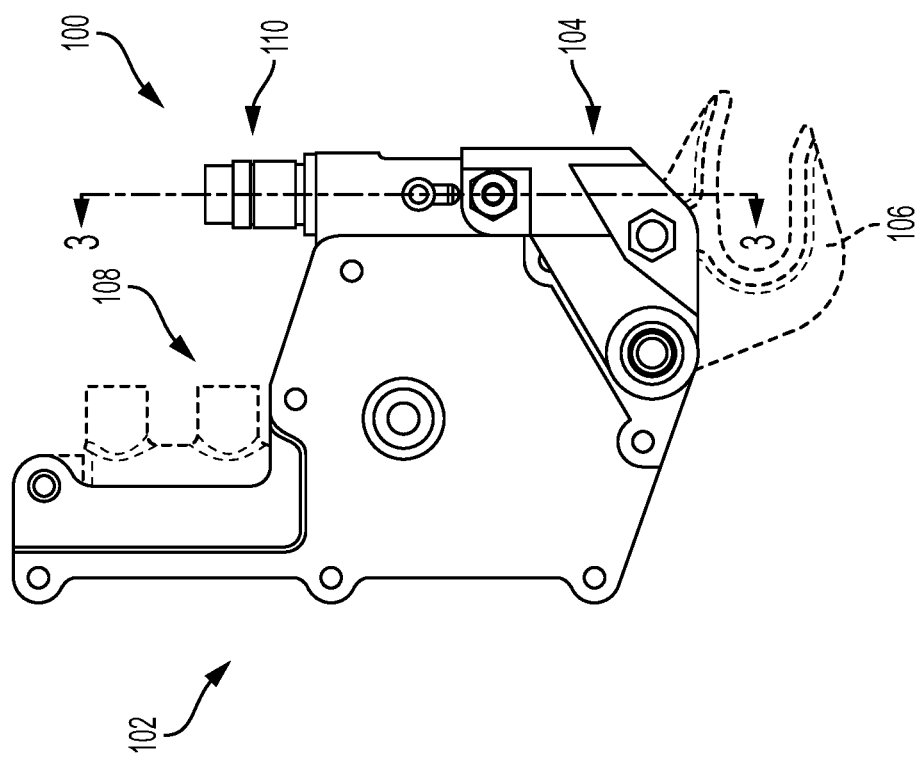
FIG. 2 is a side view of an illustrative apparatus attached to an illustrative locking mechanism, showing a follower assembly of the illustrative apparatus in an engaged position.

FIG. 2 is a side view of an illustrative apparatus, generally indicated at 100, attached to an illustrative locking mechanism, generally indicated at 102, showing a follower assembly 104 of the illustrative apparatus in an engaged position.

Apparatus 100 may be a release mechanism that allows a locking member 106 to alternately, and repeatably, release and capture a component, such as a door. Locking mechanism 102 may allow the locking member 106 to alternately and repeatably release and capture the component. Release mechanism 100 and locking mechanism 102 may be configured to operate independently from one another, having separate activation mechanisms and/or power sources. Either of release mechanism 100 or locking mechanism 102 may be configured to release the locking member while the other is maintained in a locked position. That is, release mechanism 100 and locking mechanism 102 may be parallel and/or redundant door capture lock assemblies. Release mechanism 100 may alternately be referred to as a "secondary release mechanism" or an "emergency release mechanism."

Follower assembly 104 may have any suitable structure. Follower assembly 104 is depicted in FIG. 2 in the engaged position. Follower assembly 104 may be configured to be moved from the engaged position to a release position, which may move locking member 106 from the secured position to the unsecured position independent of locking mechanism 102. See, for example, discussion related to FIGS. 4 and 6 below. Follower assembly 104 may be configured to allow locking mechanism 102 to move the locking member from the secured position to the unsecured position, while follower assembly 104 remains in the engaged position. See, for example, discussion related to FIGS. 4 and 5 below.

Locking member 106 may be a door roller hook pawl, as is indicated in dashed lines in FIG. 2, or any other door capture locking member. The configuration of locking member 106 is not integral to the function of release mechanism 100. For example, locking member 106 may be oriented ninety degrees or other suitable degrees from what is shown in FIG. 2. Locking member 106 is shown in FIG. 2 in a secured position. The locking member may be configured to pivot between a secured position in which the locking member secures a door in a closed position, and an unsecured position in which the locking member allows the door to be moved between the closed position and an open position. Locking mechanism 102 may be any appropriate door capture lock assembly.

Locking mechanism 102 may move locking member 106 from a secured position to an unsecured position and back again. Movement of the locking member in both of these directions may be activated by a primary or first actuator assembly 108, indicated in dashed lines in FIG. 2. The exact configuration of primary actuator assembly 108 is not integral to the function of release mechanism and many different kinds of actuators are possible depending on the configuration of locking mechanism 102.

In the case where locking mechanism 102 is a door capture lock assembly, release mechanism 100 may be added to, attached to, or coupled to locking mechanism 102 to provide a redundant release mechanism that may be used more than once. Other available redundant release mechanisms require either repairing or replacing certain sacrificial components after the redundant release mechanism has been used only once. Should the primary actuator assembly 108 or some other component of the locking mechanism 102 fail, then release mechanism 100 may be activated by an actuating assembly 110, separate and independent from the primary actuator assembly, thereby releasing the component from the locking member.

Figure 3:
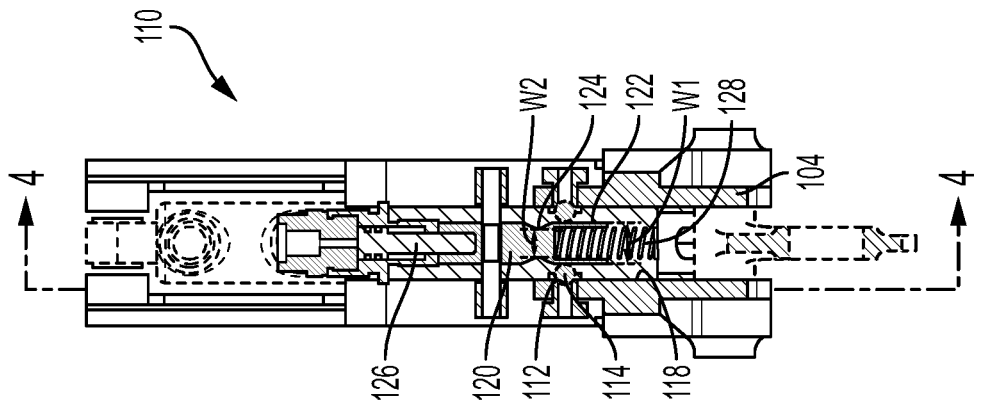
FIG. 3 is a section view of the illustrative apparatus and the illustrative locking mechanism of FIG. 2 taken along lines 3-3 in FIG. 2.

FIG. 3 is a section view of release mechanism 100, and locking mechanism 102 of FIG. 2, taken along lines 3-3 in FIG. 2. Release mechanism may include a first locking element 112, a second locking element 114, and a support assembly 116.

First locking element 112 may be included in (or be part of) follower assembly 104. First locking element may be any suitable structure configured to interact with second locking element 114. When second locking element 114 is in a locking position and engaged with the first locking element, the follower assembly may be held in the engaged position and not free to move to a release position. First locking element 112 may, for example, be one or more indentations, grooves, seats, or holes on an interior side 118 of follower assembly 104. First locking element 112 may be sized to receive second locking element 114.

Second locking element 114 may, for example, be one or more balls (such as one or more steel ball bearings). Alternatively, the second locking element may include other suitable structures that are non-spherical, such as one or more pegs, levers, arms or disks. When the one or more balls of second locking element 114 are seated in the one or more indentations of first locking element 112, follower assembly 104 may be prevented from moving. Thus, when the first and second locking elements are engaged the second locking element may be said to be in a locking position, as is indicated in FIG. 3.

Second locking element 114 may be held in the locking position with the first locking element by support assembly 116. Support assembly 116 may include a shaft 120 having a first portion 122 with a first width W1. Support assembly 116 is depicted in FIG. 3 in a proximal position, where the one or more balls of second locking element 114 are adjacent to first portion 122 and held in the indentations of first locking element 112 by first portion 122 of shaft 120.

Shaft 120 may have a second portion 124 with a second width W2 smaller than the first width W1. Support assembly 116 may have a distal position (see, for example, FIG. 9) in which the second locking element is adjacent to the second portion 124. When the support assembly is in the distal position, the second locking element may disengage from the first locking element, thereby allowing movement of the follower assembly. The second locking element may be in an unlocking position when the second locking element is spaced from the first locking element. In the case where the second locking element is one or more balls and the first locking element is one or more corresponding indentations, the balls may move horizontally in the view of FIG. 3, maintaining contact with shaft 120 as shaft 120 moves vertically downward in the view of FIG. 3.

Figure 9:
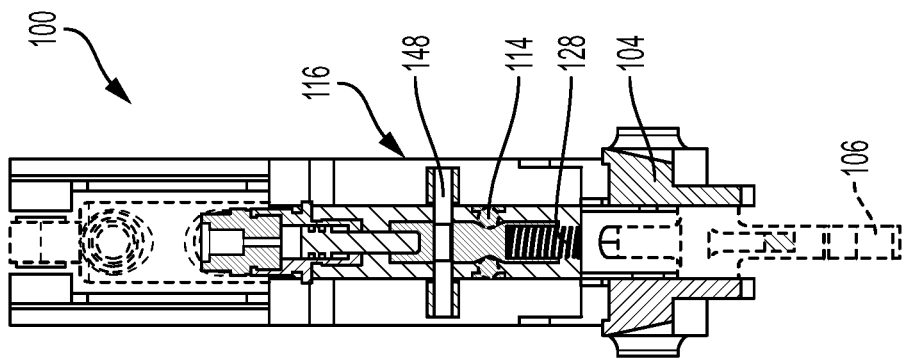
FIG. 9 is a sectional view of the illustrative apparatus and the illustrative locking mechanism of FIG. 3 taken along line 9-9 in FIG. 8.

Support assembly 116 may be urged or driven from the proximal position, as depicted in FIG. 3, to the distal position, as depicted in FIG. 9, by actuating assembly 110. Actuating assembly 110 may include, for example, a piston 126 configured to move support assembly 116, or shaft 120, from the proximal position to the distal position. Piston 126 may move, for example, in response to an increase in hydraulic pressure provided by the actuating assembly.

Actuating assembly 110 may include a bias element 128 configured to urge support assembly 116 toward and/or to the proximal position. Bias element 128 may be in the form of a spring, musical wire, or other elastic structure operatively coupled to shaft 120. When support assembly 116 is in the distal position, spring 128 may be relatively compressed and when support assembly 116 is in the proximal position, spring 128 may be relatively uncompressed.

Figure 4:
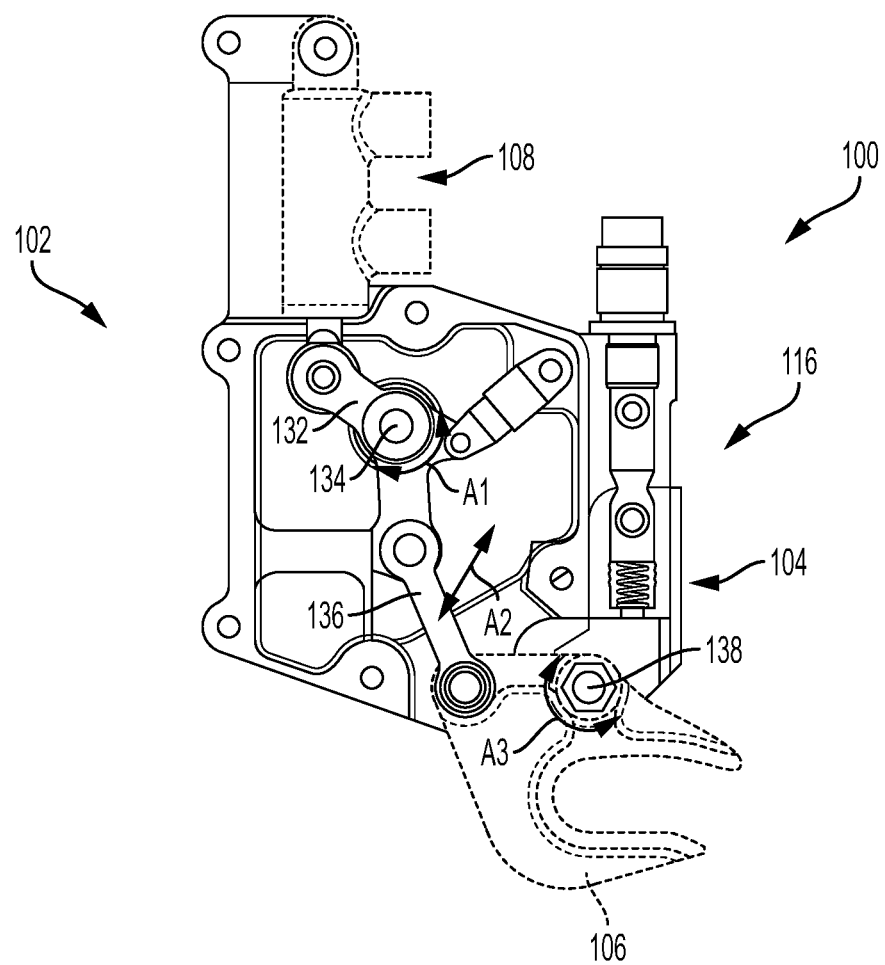
FIG. 4 is a sectional view of the illustrative apparatus and the illustrative locking mechanism of FIG. 2 taken along line 4-4 in FIG. 3, shown with a locking member of the locking mechanism in the secured position, a support assembly of the apparatus in a proximal position, and a follower assembly of the apparatus in the engaged position.
Figure 5:
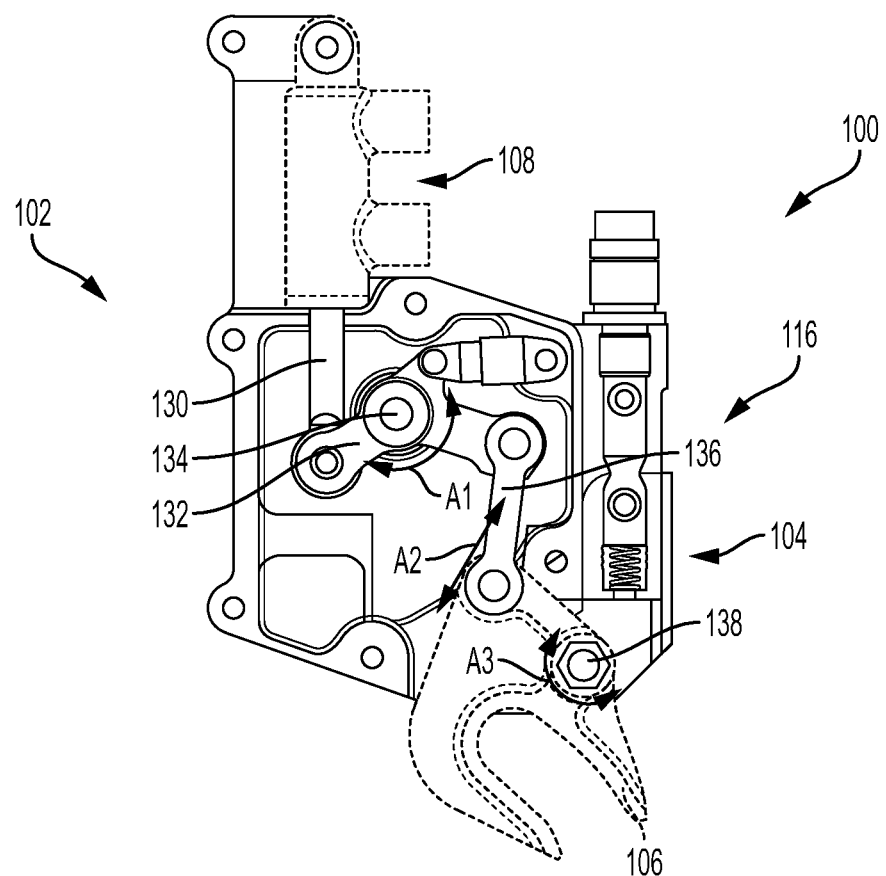
FIG. 5 is a sectional view of the illustrative apparatus and the illustrative locking mechanism of FIG. 2 taken along line 4-4 in FIG. 3, shown with the locking member of the locking mechanism in the unsecured position, a support assembly of the apparatus in the proximal position, and the follower assembly of the apparatus in the engaged position.

FIG. 4 is a sectional view of release mechanism 100 and locking mechanism 102 taken along line 4-4 in FIG. 3, shown with locking member 106 in the secured position, support assembly 116 in the proximal position, and follower assembly 104 in the engaged position. FIG. 5 is a sectional view of release mechanism 100 and locking mechanism 102 taken along line 4-4 in FIG. 3, shown with locking member 106 in the unsecured position, support assembly 116 in the proximal position, and follower assembly 104 in the engaged position. Taken together, FIGS. 4 and 5 depict an example of how locking mechanism 102 may be used independently of release mechanism 100 to move the locking member from the secured position to the unsecured position and back again.

Referring to both FIGS. 4 and 5, locking mechanism 102 may include a primary piston 130, a rotating member 132 configured to rotate around a primary axis 134 running perpendicular to the view of FIGS. 4 and 5, a primary arm 136. The rotating member 132 and the primary arm 136 being part of a primary linkage connecting the primary piston (or primary actuator) to the primary arm. Primary piston 130 may be operatively coupled to the locking member 106 through rotating member 132 and primary arm 136. Locking member 106 may be pivotably attached to follower assembly 104 at a first pivot 138.

To use locking mechanism 102 to move locking member 106 from the secured position to the unsecured position, a primary piston 130 may extend downwards, as viewed in FIGS. 4 and 5, from a first position to a second position as a result of being activated by the primary actuator assembly 108. When the piston is in the first position the locking member may be in the secured position. Downward motion of primary piston 130 may cause rotating member 132 to rotate counterclockwise around primary axis 134, as indicated by double arrow A1. Counterclockwise rotation of rotating member 132 may cause vertical motion, along a direction as indicated by double arrow A2, of primary arm. Vertical motion of primary arm 136 may cause locking member 106 to pivot in direction A3 about the first pivot 138 between the secured position and the unsecured position.

When the piston is in the second position the locking member may be in the unsecured position.

The above process may be reversed to bring the locking member from the unsecured position to the secured position as follows. Primary piston 130 may be drawn vertically up by the primary actuator assembly 108, which may in turn cause clockwise rotation along arrow A1 of rotating member 132, which may in turn cause downward motion along arrow A2 of primary arm 136, which may cause locking member 106 to pivot about the first pivot along arrow A3 from the unsecured position to the secured position. During the above movements of locking mechanism 102, release mechanism 100 may remain largely stationary. That is, locking mechanism may lock and unlock while the follower assembly 104 remains in the engaged position, the support assembly remains in the proximal position, and the first and second locking elements remain engaged in the locking position.

Figure 6:
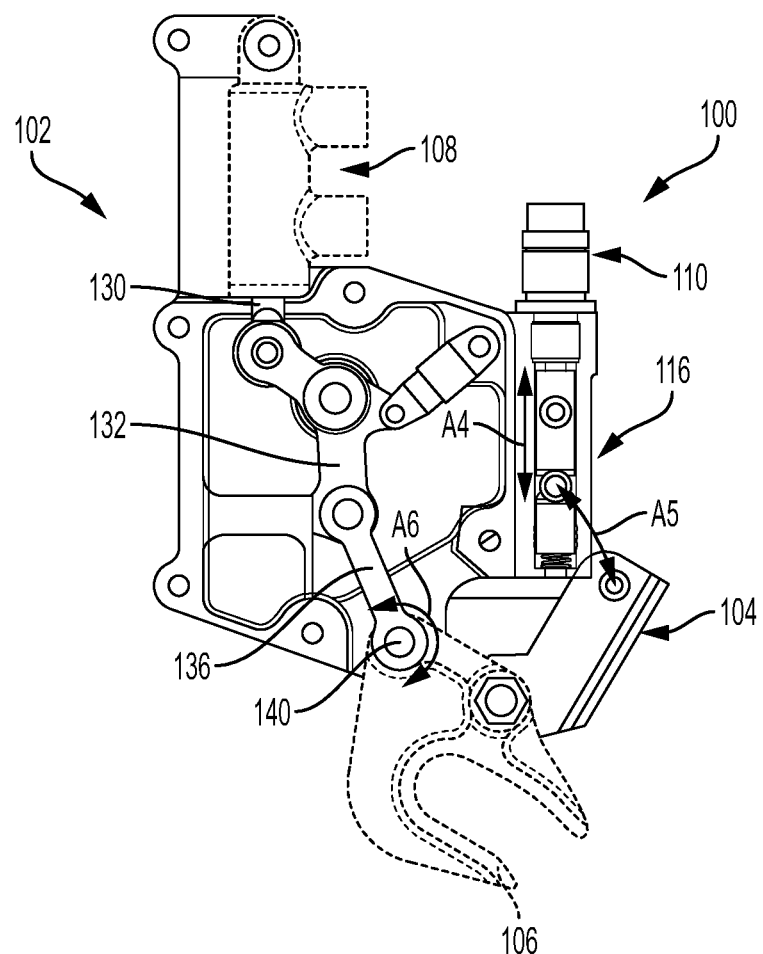
FIG. 6 is a sectional view of the illustrative apparatus and illustrative locking mechanism of FIG. 2 taken along line 4-4 in FIG. 3, shown with the locking member of the locking mechanism in the unsecured position, a support assembly of the apparatus in a distal position, and the follower assembly of the apparatus in the release position.

FIG. 6 is a sectional view of release mechanism 100 and locking mechanism 102 taken along line 4-4 in FIG. 3, shown with locking member 106 in the unsecured position, support assembly 116 in the distal position, and follower assembly 104 in the release position. Taken together, FIGS. 4 and 6 depict an example of how release mechanism 102 may be used independently of locking mechanism 102 to move the locking member from the secured to the unsecured position.

As described in reference to FIG. 3, actuating assembly 110 may drive piston 126 towards support assembly 116, along a direction generally indicated by double arrow A4, which may allow the first and second locking elements to disengage. With the first and second locking elements disengaged, follower assembly 104 may move to the release position along a direction generally indicated by double arrow A5. In some examples, at least a portion of the follower assembly may be external to a housing (or accessible from external the housing) to allow a user to move the follower assembly from the engaged position to the release position. Locking member 106 may be pivotably attached to primary arm 136 at a second pivot 140. As the follower assembly moves from the engaged position to the release position, locking member 106 may pivot about second pivot 140, in a direction generally indicated by double arrow A6, thereby moving from the secured position to the unsecured position.

During the above described process, the elements of locking mechanism 102 may remain largely stationary. In particular, release mechanism 100 may be used to move the locking member from the secured position to the unsecured position without activating primary actuator assembly 108, moving primary piston 130, rotating the rotating member, or moving primary arm 136. An illustrative method for returning the locking member to the secured position, and the follower assembly to the engaged position, is discussed in reference to FIG. 7 below.

Figure 7:
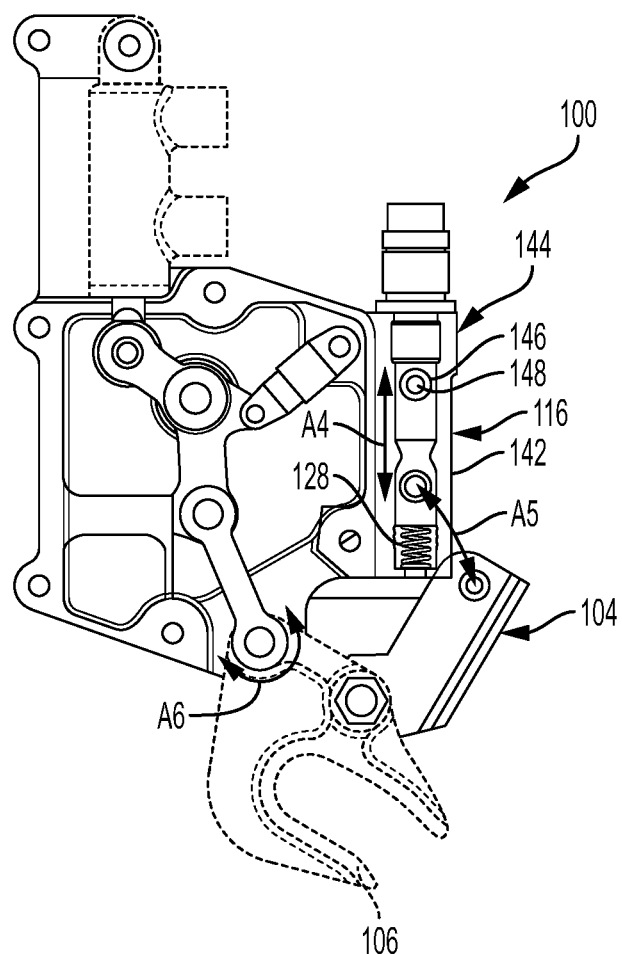
FIG. 7 is a sectional view of the illustrative apparatus and the illustrative locking mechanism of FIG. 2 taken along line 4-4 in FIG. 3, shown with the locking member of the locking mechanism in the unsecured position, a support assembly of the apparatus in the proximal position, and the follower assembly of the apparatus in the release position.

FIG. 7 is a sectional view of release mechanism 100 and locking mechanism 102 taken along line 4-4 in FIG. 3, shown with locking member 106 in the unsecured position, support assembly 116 in the proximal position, and follower assembly 104 of the apparatus in the release position.

As described in reference to FIG. 3 above, bias element 128 may urge or push support assembly 116 back along arrow A4 from the distal position, as depicted in FIG. 6, to the proximal position, as depicted in FIG. 7. When in the proximal position, support assembly may push second locking element 114 outward, thereby preventing the follower assembly from returning to the engaged position. When in the distal position, support assembly may allow the second locking element to move inward to the unlocking position.

Release mechanism 100 may include a housing 142 and a reset assembly 144. Housing 142 may be configured to contain second locking element 114, support assembly 116, piston 126, and/or bias element 128. Housing 142 may include one or more apertures 146 or holes, seen best in FIG. 8, though which a user may gain access to reset assembly 144 from external the housing.

Reset assembly 144 may include one or more handles 148, seen also in FIG. 9. Handle 148 may be external to housing 142 and may be configured to allow a user to move the support assembly 116 to the distal position from external the housing. Handle 148 may extend through apertures 146 and may be operatively coupled to shaft 120 of the support assembly.

One possible method for returning locking member 106 to the secured position and follower assembly 104 to the engaged position will now be described. Release mechanism 100 may begin as depicted in FIG. 7 with support assembly 116 in the proximal position and the follower assembly in the release position. A user may access reset assembly 144 through one or more handles 148 and move the support assembly from the proximal position to the distal position along arrow A4, as depicted in FIG. 6. This motion may allow the second locking element to move from the locking position to the unlocking position. While using the reset assembly to maintain the support assembly in the distal position, follower assembly 104 may be returned to the engaged position along arrow A5. As the follower assembly moves to the engaged position, the locking member may move concurrently along arrow A6 to the secured position. The reset assembly may then be released by the user which may allow bias element 128 to urge or return the support assembly to the proximal position, which may in turn return the second locking element to the locking position.

In the case where release mechanism 100 is a secondary or emergency capture lock mechanism and locking mechanism 102 is a primary capture lock mechanism, the release mechanism 100 may be locked and unlocked repeatably without having to repair or replace any damaged parts. The function of release mechanism 100 may realized without using the components of locking mechanism 102 so that release mechanism 100 is independent and redundant to locking mechanism 102.

Figure 8:
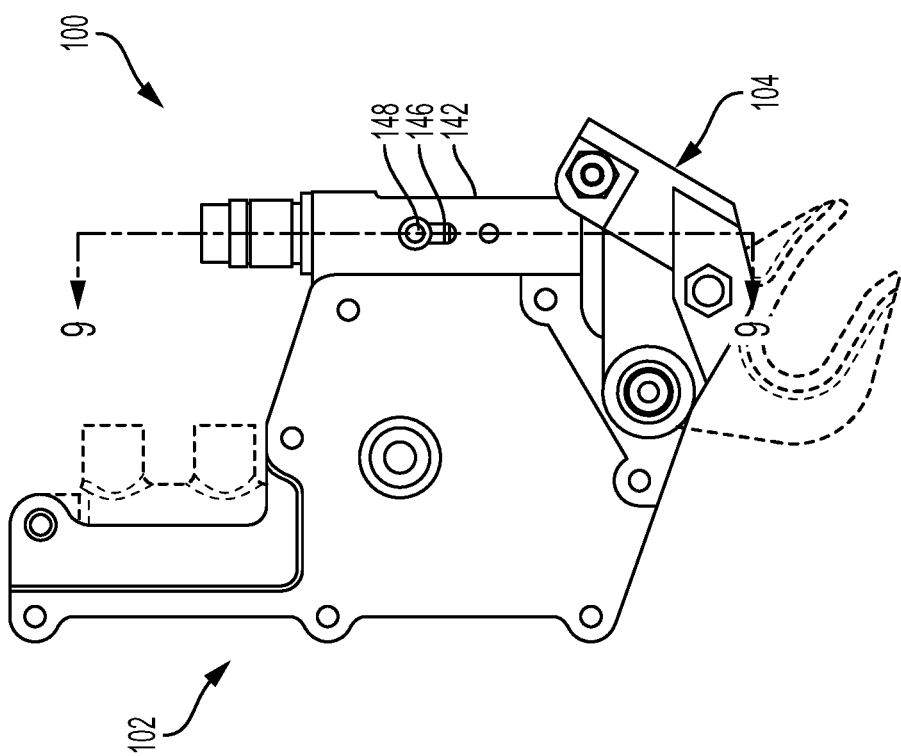
FIG. 8 is side view of the illustrative apparatus and the illustrative locking mechanism of FIG. 2, showing the follower assembly of the illustrative apparatus in a release position.

FIG. 8 is side view of release mechanism 100 and locking mechanism 102, showing the follower assembly 104 in a release position. Handle 148 of reset assembly 144 may be accessible through aperture 146 in housing 142. Aperture 146 may configured so that a user can access handle 148 from external the housing and use the handle to move the support assembly from the proximal position down to the distal position.

FIG. 9 is a sectional view of release mechanism 100 and locking mechanism 102 taken along line 9-9 in FIG. 8. In FIG. 9, support assembly 116 is in the distal position, second locking element 114 is in the unlocking position, spring 128 is compressed, follower assembly 104 is in the release position, and locking member 106 is in the unsecured position.

Figure 10:
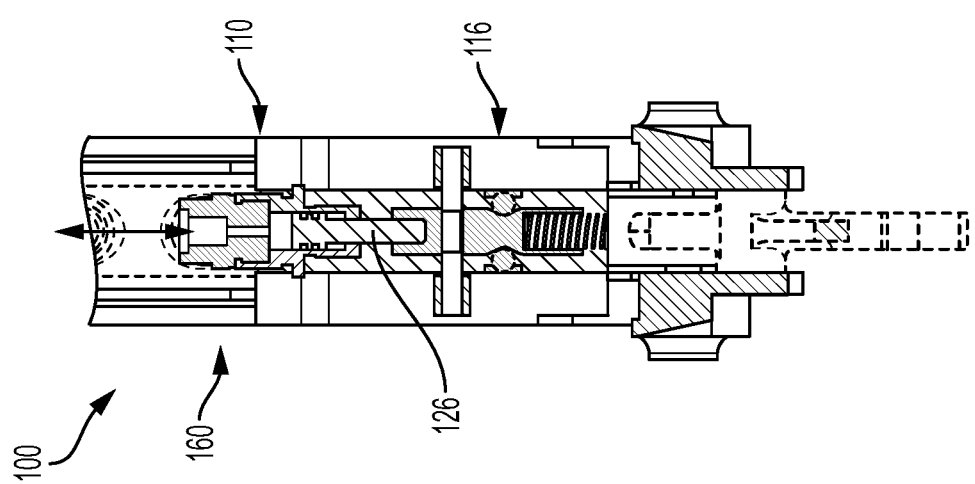
FIG. 10 is a sectional view of the illustrative apparatus and the illustrative locking mechanism of FIG. 2 taken along line 9-9 in FIG. 8, shown with an example of a hydraulic or pneumatic actuator.

FIG. 10 is a sectional view of release mechanism 100 taken along line 9-9 in FIG. 8, shown with an example of a hydraulic or pneumatic actuating assembly and with the support assembly in the distal position. Release mechanism 100 may be connected to a hydraulic system that is configured to provide hydraulic pressure to actuating assembly 110 to drive piston 126 towards the support assembly 116 in order to move the support assembly to the distal position. In another illustrative embodiment, the release mechanism may be connected to a pneumatic system configured to provide pneumatic pressure to actuating assembly 110 to drive piston 126 towards the support assembly 116 in order to move the support assembly to the distal position.

Figure 11:
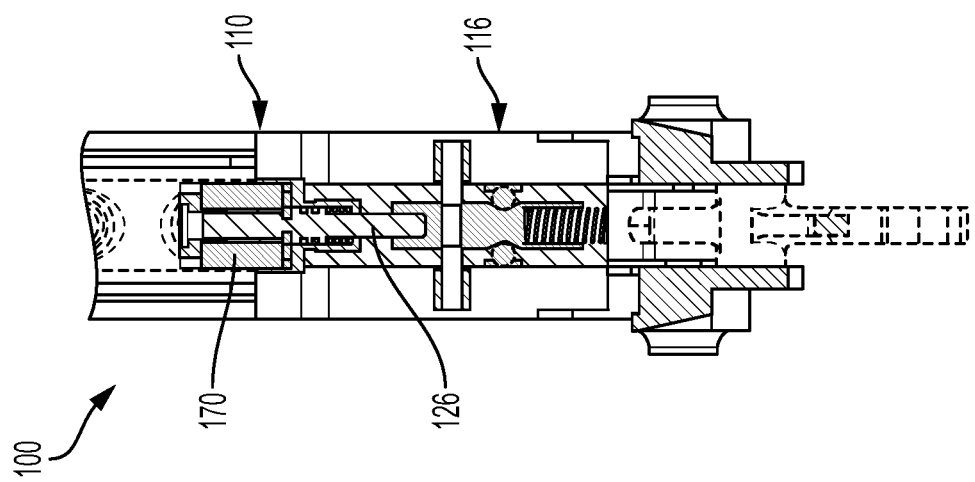
FIG. 11 is a sectional view of the illustrative apparatus and the illustrative locking mechanism of FIG. 2 taken along line 9-9 in FIG. 8, shown with an example of an electric actuator.

FIG. 11 is a sectional view of release mechanism 100 taken along line 9-9 in FIG. 8, shown with an example of an electric actuator and with the support assembly in the distal position. Actuating assembly 110 may include a solenoid valve 170 configured to drive piston 126 toward support assembly 116 to move the support assembly to the distal position. The solenoid valve may be connected to a source of electrical power.

Figure 12:
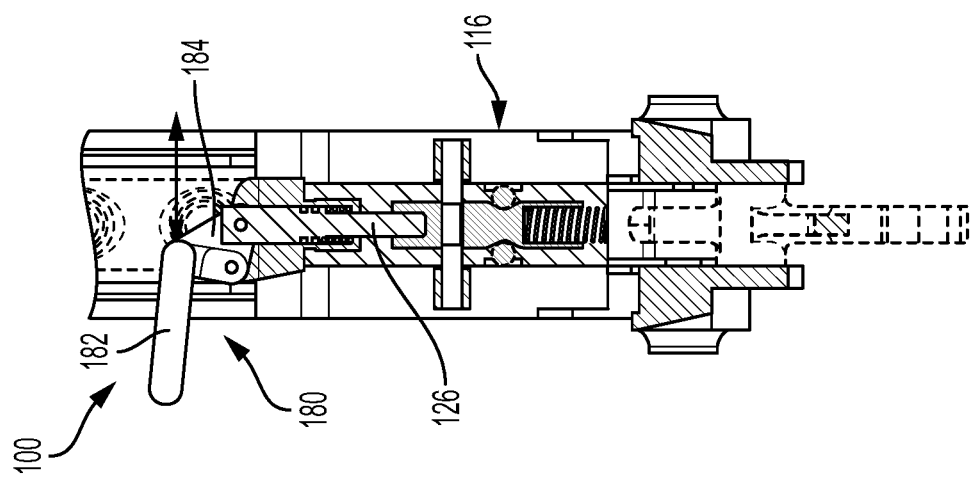
FIG. 12 is a sectional view of the illustrative apparatus and the illustrative locking mechanism of FIG. 2 taken along line 9-9 in FIG. 8, shown with an example of a manual actuator.

FIG. 12 is a sectional view of release mechanism 100 taken along line 9-9 in FIG. 8, shown with an example of a mechanical actuator and with the support assembly in the distal position. Actuating assembly may include a manual actuator 180 configured to drive piston 126 towards support assembly 116 to move the support assembly to the distal position. Manual actuator 180 may include a lever or arm 182 operatively coupled to shaft 126 through a linkage member 184 so that when lever 182 moves horizontally as the result of some mechanical force shaft 126 moves vertically.

Example 3

Figure 13:
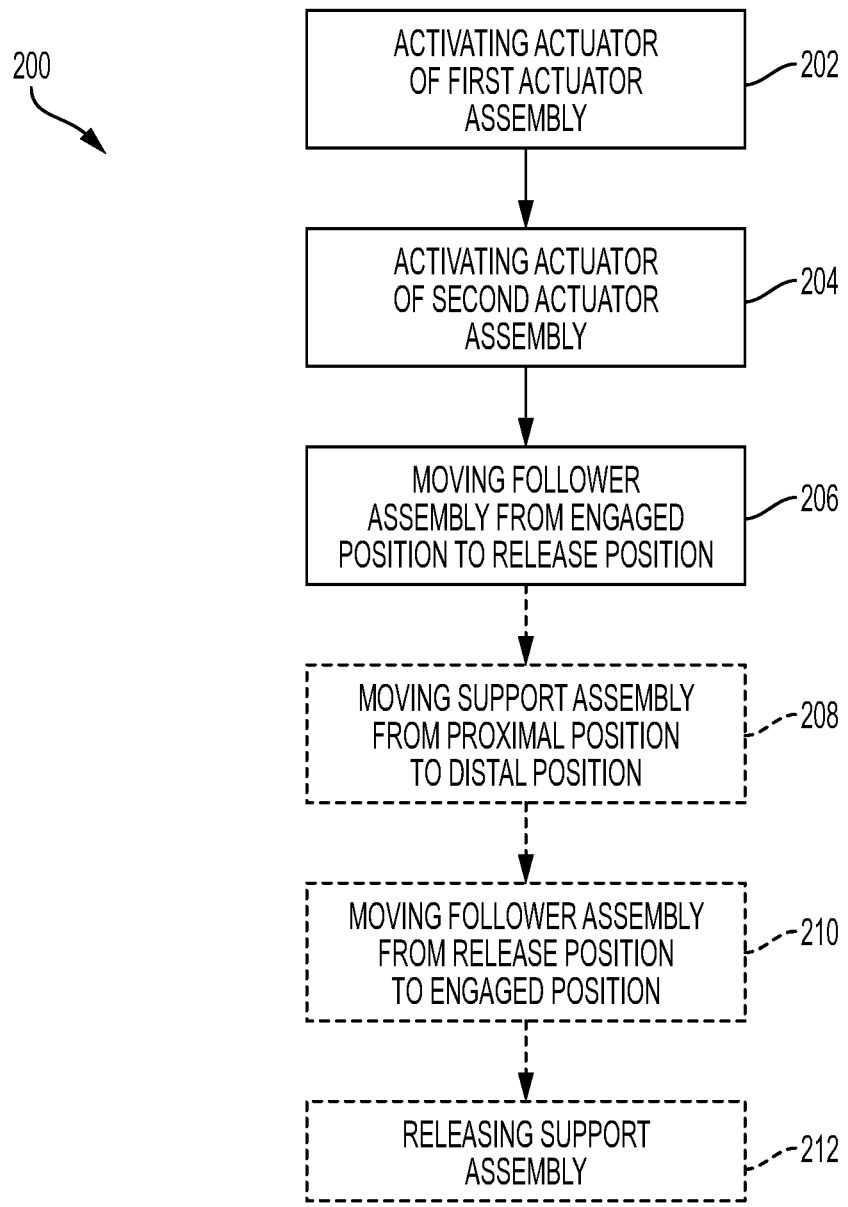
FIG. 13 is a flowchart depicting an illustrative method of managing access through a door having a locking mechanism and a release apparatus.

This example describes a method of managing access through a door, which may be used in conjunction with any of the systems, methods, or apparatuses described herein, see FIG. 13.

FIG. 13 depicts multiple steps of a method, generally indicated at 200, of managing access through a door. Although various steps of method 200 are described below and depicted in FIG. 13, the steps need not necessarily all be performed, some steps may be repeated, and in some cases may be performed in a different order than the order shown.

Method 200 may include a step 202 of activating an actuator of a first actuator assembly. The first actuator assembly may be activated to move a piston from a second position in which a locking member is in an unsecured position that allows the door to be moved between closed and open positions, to a first position in which the locking member is in a secured position that secures the door in the closed position. For example, the first actuator assembly may be primary actuator assembly 108, the piston may be primary piston 130, and the second position of the piston may be the downward position depicted in FIG. 5 where locking member 106 is in the unsecured position. When the locking member is unsecured, the door may be free to be opened and closed. The first position of the piston may be the upward position depicted in FIG. 4 where locking member 106 is in the secured position. If the door is closed when the piston is moved to the first position, the door may be secured in the closed position by the locking member.

Method 200 may include a step 204 of activating an actuator of a second actuator assembly. The second actuator assembly may be activated to unlock a follower assembly that is pivotably attached to the locking member. The second actuator assembly may be different from the first actuator assembly and may be, for example, actuating assembly 110. The follower assembly may be follower assembly 104 which may be pivotably attached to the locking member 106 at the first pivot 138.

Step 204 may include moving a support assembly from a proximal position in which the support assembly supports a first locking element in a locking position to a distal position in which the support assembly allows the first locking element to move from the locking position to an unlocking position. The first locking element may be engaged with a second locking element of a follower assembly in the locking position and spaced from the second locking element of the follower assembly in the unlocking position. For example, the first locking element may be second locking element 114 and the second locking element may be first locking element 112. As depicted in FIG. 3, support assembly 116 supports the second locking element(s) in a locking position with the first locking element(s) of follower assembly 104 when support assembly 116 is in the proximal position. As depicted in FIG. 9, support assembly 116 allows the second locking element(s) to move away from the first locking element(s) to the unlocking position when the support assembly is in the distal position.

Step 204 may include releasing the actuator of the second actuator assembly to allow a bias element to urge the support assembly toward the proximal position. For example, bias element 128 may urge support assembly 116 toward the proximal position as described in reference to FIG. 3.

Activating the actuator of the second actuator assembly may include activating a hydraulic system to deliver hydraulic pressure to move the support assembly from the proximal position to the distal position. For example, power assembly 48 described in reference to FIG. 1 may provide hydraulic pressure to the support assembly.

Activating the actuator of the second actuator assembly may include activating a pneumatic system to deliver pneumatic pressure to move the support assembly from the proximal position to the distal position. For example, power assembly 48 described in reference to FIG. 1 may provide pneumatic pressure to the support assembly.

Activating the actuator of the second actuator assembly may include activating a solenoid to move the support assembly from the proximal position to the distal position. For example, solenoid valve 170 described in reference to FIG. 11 may move support assembly 116 from the proximal position to the distal position.

Activating the actuator of the second actuator assembly may include moving a lever to move the support assembly from the proximal position to the distal position. For example, lever 182 described in reference to FIG. 12 may move support assembly 116 from the proximal position to the distal position.

Method 200 may include a step 206 of moving the follower assembly from an engaged position to a release position. When the follower assembly is in the engaged positon, the locking member may be in the secured position. When the follower assembly is in the release position, the locking member may be in the unsecured position and the piston of the first actuator assembly may be in the second position. For example, as depicted in FIG. 4, follower assembly 104 may be in the engaged position while locking member 106 is in the secured position. Further, as depicted in FIG. 6, follower assembly 104 may be in the release position, while locking member 106 is in the unsecured position and primary piston 130 is in the upward position. As described in reference to FIGS. 4 and 6 it may be possible to move follower assembly 104 from the engaged position to the release position, which may move locking member 106 from the secured position to the unsecured position, all while maintaining primary piston 130 in the upward position.

Method 200 may optionally include a step 208 of moving the support assembly from the proximal position to the distal position. Moving the support assembly may include moving the support assembly via one or more reset handles. Moving the support assembly may be done against the urging of the bias element. For example, as discussed in reference to FIG. 7, handles 148 may be used to move support assembly 116 from the proximal to the distal position. This movement may compress the spring of bias element 128 and as such may be against the urging of spring 128.

Method 200 may optionally include a step 210 of moving the follower assembly from the release position to the engaged position. For example, as described in reference to FIG. 7, once support assembly 116 is in the distal position, and the one or more balls of the second locking element 114 are in the unlocking position, follower assembly 104 may be moved from the release position to the engaged position.

Method 200 may optionally include a step 212 of releasing the support assembly. Releasing the support assembly may allow the bias element to urge the support assembly to the proximal position. For example, as described in reference to FIG. 7, bias element 128 may urge support assembly 116 to the proximal position once follower assembly 104 is in the engaged position and a user has released the support assembly, perhaps by releasing handles 148.

Method 200 described a method for managing access through a door, where steps 202 through 206 may allow a door to be released from a door capture lock mechanism, such as release mechanism 100, and steps 208 through 212 may allow the door to be secured by the door capture lock mechanism, such as release mechanism 100.

Example 4

This section describes additional aspects and features of systems, apparatuses, and methods for releasing a locking member of a locking mechanism, which may or may not be claimed, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A release mechanism, comprising:

a follower assembly movably attached to a locking member that moves between a secured position in which the locking member secures a component in a first position, and an unsecured position in which the locking member allows the component to be moved between the first position and a second position different from the first position, the follower assembly includes a first locking element;

a second locking element configured to move between a locking position in which the second locking element engages the first locking element, and an unlocking position in which the second locking element is spaced from the first locking element; and a support assembly configured to move between a proximal position in which the support assembly supports the second locking element in the locking position, and a distal position in which the support assembly allows the second locking element to move from the locking position to the unlocking position, wherein the follower assembly is movably attached to the locking member such that the locking member is allowed to move between the secured and unsecured positions when the first locking element is engaged by the second locking element in the locking position, and the follower assembly is configured to move the locking member between the secured and unsecured positions when the second locking element is spaced from the first locking element in the unlocking position.

A1. The release mechanism of paragraph A0, wherein the follower assembly is movably attached to the locking member such that the locking member is allowed to pivot about a first pivot between the secured and unsecured positions when the first locking element is engaged by the second locking element in the locking position.

A2. The release mechanism of paragraph A1, wherein the follower assembly is configured to pivot the locking member about a second pivot between the secured and unsecured positions when the second locking element is spaced from the first locking element in the unlocking position, and the second pivot is different from the first pivot.

A3. The release mechanism of any of paragraphs A0-A2, wherein the second locking element includes at least one ball.

A4. The release mechanism of paragraph A3, wherein the first locking element includes at least one hole sized to receive the at least one ball when in the locking position.

A5. The release mechanism of any of paragraphs A0-A4, wherein the support assembly includes a shaft having a first portion with a first width, and a second portion with a second width smaller than the first width, wherein the second locking element is adjacent to the first portion and spaced from the second portion in the proximal position, and the second locking element is adjacent to the second portion and spaced from the first portion in the distal position.

A6. The release mechanism of any of paragraphs A0-A5, further comprising an actuating assembly having a piston configured to move the support assembly to the distal position.

A7. The release mechanism of paragraph A6, further comprising a hydraulic system configured to provide hydraulic pressure to the actuating assembly to drive the piston toward the support assembly to move the support assembly to the distal position.

A8. The release mechanism of paragraph A6, further comprising a pneumatic system configured to provide pneumatic pressure to the actuating assembly to drive the piston toward the support assembly to move the support assembly to the distal position.

A9. The release mechanism of paragraph A6, wherein the actuating assembly further includes a solenoid valve configured to drive the piston toward the support assembly to move the support assembly to the distal position.

A10. The release mechanism of paragraph A6, wherein the actuating assembly further includes a manual actuator configured to drive the piston toward the support assembly to move the support assembly to the distal position.

A11. The release mechanism of paragraph A6, wherein the actuating assembly further includes a bias element configured to urge the support assembly to the proximal position.

A12. The release mechanism of any of paragraphs A0-A11, further comprising:

a reset assembly configured to move the support assembly to the distal position; and a housing configured to contain at least the second locking element and the support assembly, wherein the reset assembly includes at least one handle external the housing and configured to allow a user to move the support assembly to the second position.

A13. The release mechanism of any of paragraphs A0-A12, wherein the locking member is a door roller hook pawl and the component is a door.

B0. A door lock system, comprising:
a housing;
a lock assembly including:
a locking member configured to pivot about a second pivot between a secured position in which the locking member secures a door in a closed position, and an unsecured position in which the locking member allows the door to be moved between the closed position and an open position,
a first actuator assembly having a piston configured to move between a first position in which the locking member is in the secured position, and a second positon in which the locking member is in the unsecured position; and a release mechanism including:
a follower assembly pivotably attached to the locking member at a first pivot, the follower assembly having a first locking element,
a second locking element configured to move between a locking position in which the second locking element engages the first locking element, and an unlocking position in which the second locking element is spaced from the first locking element,
a support assembly configured to move between a proximal position in which the support assembly supports the second locking element in the locking position, and a distal position in which the support assembly allows the second locking element to move from the locking position to the unlocking position, and
a second actuator assembly configured to move the support assembly to the distal position,
wherein the follower assembly is configured to allow a user to move the follower assembly from an engaged position in which the locking member is in the secured position, to a release position in which the locking member is in the unsecured position when (1) the support assembly is in the distal position and (2) the piston of the first actuator assembly is in the first position.

B1. The door lock system of paragraph B0, wherein the locking member pivots at the first pivot when the first actuator assembly moves the locking member between the secured and unsecured positions.

B2. The door lock system of any of paragraphs B0-B1, wherein the follower assembly is configured to pivot with the locking member at the second pivot between the engaged and release positions when (1) the support assembly is in the distal position and (2) the piston of the first actuator assembly is in the first position.

C0. A method of managing access through a door, the method comprising:
activating an actuator of a first actuator assembly to move a piston from a second position in which a locking member is in an unsecured position that allows the door to be moved between closed and open positions, to a first position in which the locking member is in a secured position that secures the door in the closed position;
activating an actuator of a second actuator assembly to unlock a follower assembly that is pivotably attached to the locking member, the second actuator assembly being different from the first actuator assembly; and
moving the follower assembly from an engaged position in which the locking member is in the secured position, to a release position in which the locking member is in the unsecured position with the piston of the first actuator assembly in the first position.

C1. The method of paragraph C0, wherein activating an actuator of a second actuator assembly includes:
moving a support assembly from a proximal position in which the support assembly supports a first locking element in a locking position, to a distal position in which the support assembly allows the first locking element to move from the locking position to an unlocking position, the first locking element is engaged with a second locking element of a follower assembly in the locking position, and spaced from the second locking element of the follower assembly in the unlocking position; and
releasing the actuator of the second actuator assembly to allow a bias element to urge the support assembly toward the proximal position.

C2. The method of paragraph C1, further comprising:
moving, via one or more reset handles, the support assembly from the proximal position to the distal position against urging of the bias element;
moving the follower assembly from the release position to the engaged position; and
releasing the support assembly to allow the bias element to urge the support assembly to the proximal position.

Advantages, Features, Benefits

The different embodiments of the systems, apparatuses, and methods for releasing a locking member of a locking mechanism described herein provide several advantages over known solutions for overriding or bypassing a locking mechanism. For example, the illustrative embodiments of the systems, apparatuses, and methods for the release of a locking member of a locking mechanism described herein allow the release of a locking member without destruction of one or more components of the locking mechanism. Additionally, and among other benefits, illustrative embodiments of the systems, apparatuses, and methods for releasing a locking member of a locking mechanism herein allow the release of the locking member without relying on other components of the locking mechanism. No known system or device can perform these functions, particularly in door capture lock mechanisms of aircrafts. Thus, the illustrative embodiments described herein are particularly useful for releasing such lock mechanisms. However, not all embodiments described herein provide the same advantages or the same degree of advantage.

Conclusion

The disclosure set forth above may encompass multiple distinct examples with independent utility. Although each of these examples has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed disclosure. The subject matter of the examples includes all novel and nonobvious combinations and subcombinations of the various elements, features, functions, and/or properties disclosed herein. The following claims particularly point out certain combinations and subcombinations regarded as novel and nonobvious. Examples embodied in other combinations and subcombinations of features, functions, elements, and/or properties may be claimed in applications claiming priority from this or a related application. Such claims, whether directed to a different example or to the same example, and whether broader, narrower, equal, or different in scope to the original claims, also are regarded as included within the subject matter of the examples of the present disclosure.

I claim:

1. A method of managing access through a door, the method comprising:

providing a locking member, the locking member being pivotally moveable to a locked position for capturing a component to lock the door and the locking member being pivotally moveable to an unlocking position for releasing the component to unlock the door;

locking the door by activating a first actuator assembly having a piston configured to move between a first position, where the locking member is pivotally secured in the locked position to lock the door, and a second positon, where the locking member is pivotally released to the unlocking position to unlock the door, the piston being connected to the locking member by a primary linkage, where the primary linkage includes a primary arm pivotally connected to the locking member;

unlocking the door by activating a second actuator assembly to release a follower assembly that is pivotally attached to the locking member; and pivotally moving the follower assembly to pivot the lock member about the primary arm and unlock the door without moving the piston or the primary linkage.

2. The method of claim 1, wherein pivotally moving the follower assembly includes:

moving a support assembly from a proximal position in which the support assembly supports a locking element in engagement with the follower assembly, to a distal position in which the support assembly allows the locking element to disengage the follower assembly; and releasing the support assembly to allow a bias element to urge the support assembly toward the proximal position.

3. The method of claim 2, further comprising:

moving, via one or more reset handles, the support assembly from the proximal position to the distal position against urging of the bias element;

moving the follower assembly back to an engaged position; and releasing the support assembly to allow the bias element to urge the support assembly to the proximal position.

4. The method of claim 1, wherein the locking member is alternately pivotable about first and second pivot axes, wherein the first pivot axis is moveable and the second axis is fixed during the step of locking and unlocking the door, and the first axis is fixed and the second axis is moveable during the step of pivotally moving the follower assembly.

5. A method of releasing a door, the method comprising:

providing a latch portion, the latch portion being pivotally moveable to a locked position for capturing a component to lock the door and the latch portion being pivotally moveable to an unlocking position for releasing the component to unlock the door;

activating a first actuator assembly of a lock mechanism to pivotally move the latch portion via the lock mechanism to the locked position in which the door is locked by the latch portion, where the lock mechanism includes a primary arm having an end connected to the first actuator assembly through a primary linkage, and the primary arm having another end pivotally connected to the latch portion;

activating a second actuator assembly, of an override mechanism, to release a follower assembly of the override mechanism, wherein the follower assembly is pivotably coupled to the latch portion; and pivoting the follower assembly to move the latch portion from the locked position to a release position in which the door is openable, where the latch portion pivots about the primary arm of the lock mechanism while the primary arm and the primary linkage remain stationary.

6. The method of claim 5, wherein activating the second actuator assembly includes:

urging a support assembly from a first position in which the support assembly supports a locking element in engagement with the follower assembly, to a second position in which the support assembly allows the locking element to disengage the follower assembly; and releasing the support assembly to allow a bias element to urge the support assembly to the first position.

7. The method of claim 6, further comprising:

using a reset handle to move the support assembly to the second position;

pivoting the follower assembly back to a starting position; and releasing the support assembly to allow the bias element to urge the support assembly to the first position.

8. The method of claim 6, wherein the locking element includes a ball.

9. The method of claim 8, wherein the follower assembly includes a hole sized to at least partially receive the ball when the locking element engages the follower assembly.

10. The method of claim 8, wherein the support assembly includes a shaft having a recess sized to at least partially receive the ball when the support assembly is in the second position.

11. The method of claim 6, wherein urging the support assembly from the first position to the second position includes moving the support assembly with a piston of the second actuator assembly.

12. The method of claim 5, wherein activating the first actuator assembly of the lock mechanism to pivotally move the latch portion via the lock mechanism to the locked position includes pivoting the latch portion about a first pivot.

13. The method of claim 12, wherein pivoting the follower assembly to move the latch portion from the locked position to a release position includes pivoting the follower assembly and the latch portion about a second pivot.

14. The method of claim 13, wherein pivoting the latch portion about the first pivot moves the second pivot and pivoting the latch portion about the second pivot moves the first pivot.

15. A method of overriding a lock mechanism, comprising:

providing a latch member, the latch member being pivotally moveable to a locked position for engaging a component to lock the door and the latch member being pivotally moveable to an unlocking position for releasing the component to unlock the door;

pivoting the latch member to engage the component of the door, by actuating a first actuator assembly of a lock mechanism, where the lock mechanism includes a primary linkage connected to the first actuator, where the primary linkage includes a primary arm pivotally connected to the latch member; and pivoting the latch member to release the door, by actuating a second actuator assembly of an emergency release mechanism, where the emergency release mechanism is attached to the latch member and pivots the latch member while the primary arm and the primary linkage of the lock mechanism remain stationary.

16. The method of claim 15, wherein the lock mechanism and the emergency release mechanism are independently operable.

17. The method of claim 15, wherein pivoting the latch member by actuating the first actuator assembly of the lock mechanism includes pivoting the latch member about a first pivot, and pivoting the latch member by actuating the second actuator assembly of the emergency release mechanism includes pivoting the latch member about a second pivot.

18. The method of claim 15, wherein pivoting the latch member by actuating the second actuator assembly of the emergency release mechanism includes:

releasing a follower assembly of the emergency release mechanism, the latch member being pivotably attached to the follower assembly; and pivoting the follower assembly.

19. The method of claim 18, wherein releasing the follower assembly includes urging a support assembly from a first position to a second position to allow a locking element of the emergency release mechanism to disengage the follower assembly.

20. The method of claim 19, further comprising moving the follower assembly to engage the locking element, to reset the emergency release mechanism.

\* \* \* \* \*